US008498629B2

(12) United States Patent
March et al.

(10) Patent No.: US 8,498,629 B2
(45) Date of Patent: Jul. 30, 2013

(54) EXTENSIBLE HUMAN MACHINE INTERFACE (HMI) PLUGIN ARCHITECTURE FOR RADIO SOFTWARE SYSTEM AND RELATED METHOD

(75) Inventors: David March, Rochester, NY (US); Glen Dragon, Pittsford, NY (US); Christopher Page, Rochester, NY (US); Michael E. Wilkerson-Barker, Hilton, NY (US)

(73) Assignee: Harris Corporation, Melbourne, FL (US)

( * ) Notice: Subject to any disclaimer, the term of this patent is extended or adjusted under 35 U.S.C. 154(b) by 896 days.

(21) Appl. No.: 11/253,019

(22) Filed: Oct. 18, 2005

(65) Prior Publication Data

US 2007/0087735 A1   Apr. 19, 2007

(51) Int. Cl.
*H04M 3/00* (2006.01)
*H04M 1/00* (2006.01)
*H04B 1/38* (2006.01)
*G06F 9/00* (2006.01)
*G06F 9/24* (2006.01)

(52) U.S. Cl.
USPC ..... 455/418; 455/419; 455/550.1; 455/552.1; 455/566; 713/1; 713/100

(58) Field of Classification Search
USPC ............. 455/418, 547, 419, 550.1, 552.1, 455/566
See application file for complete search history.

(56) References Cited

U.S. PATENT DOCUMENTS

| | | | |
|---|---|---|---|
| 3,932,847 A | 1/1976 | Smith | 340/172.5 |
| 4,349,890 A | 9/1982 | Chang | 364/900 |
| 5,040,158 A | 8/1991 | Lee et al. | 368/10 |
| 5,327,468 A | 7/1994 | Edblad et al. | 375/107 |
| 6,052,600 A * | 4/2000 | Fette et al. | 455/509 |
| 6,285,912 B1 * | 9/2001 | Ellison et al. | 700/11 |
| 6,466,607 B1 | 10/2002 | Chauncey et al. | 375/131 |
| 6,484,276 B1 | 11/2002 | Singh et al. | |
| 6,721,581 B1 * | 4/2004 | Subramanian | 455/575.1 |
| 6,785,556 B2 * | 8/2004 | Souissi | 455/557 |
| 6,804,169 B2 | 10/2004 | Addy et al. | 368/10 |
| 6,876,864 B1 * | 4/2005 | Chapin | 455/509 |
| 6,937,877 B2 * | 8/2005 | Davenport | 455/552.1 |
| 7,043,023 B2 * | 5/2006 | Watanabe et al. | 380/270 |
| 7,057,547 B2 * | 6/2006 | Olmsted et al. | 341/176 |
| 7,151,925 B2 * | 12/2006 | Ting et al. | 455/418 |
| 7,155,254 B2 * | 12/2006 | Pinder | 455/557 |

(Continued)

FOREIGN PATENT DOCUMENTS

| WO | 2005008480 | 1/2005 |
|---|---|---|
| WO | 2005008482 | 1/2005 |

OTHER PUBLICATIONS

Hoffmeyer et al., "Radio Software Download for Commerccial Wireless Reconfigurable Devices", IEEE, vol. 42, No. 3, Mar. 2004, pp. S26-S32.

*Primary Examiner* — Matthew Sams
(74) *Attorney, Agent, or Firm* — Allen, Dyer, Doppelt, Milbrath & Gilchrist, P.A.

(57) ABSTRACT

A software-defined radio includes an executable radio software system operable with a radio circuit and conforming to the software communications architecture (SCA) specification and defining an operating environment that allows a waveform application to operate with a radio circuit for transmitting and receiving voice and data. An extensible Human-Machine Interface (HMI) plugin module is operable for allowing a selected waveform application to integrate with the radio circuit and provide an HMI user interface.

20 Claims, 14 Drawing Sheets

U.S. PATENT DOCUMENTS

| | | | |
|---|---|---|---|
| 7,349,719 B2 * | 3/2008 | Buniatyan | 455/557 |
| 7,404,074 B2 * | 7/2008 | Murotake | 713/100 |
| 7,487,493 B1 * | 2/2009 | Faulkner | 717/105 |
| 2002/0082044 A1 * | 6/2002 | Davenport | 455/552 |
| 2002/0183013 A1 * | 12/2002 | Auckland et al. | 455/73 |
| 2003/0050055 A1 * | 3/2003 | Ting et al. | 455/419 |
| 2003/0114163 A1 * | 6/2003 | Bickle et al. | 455/450 |
| 2004/0005910 A1 * | 1/2004 | Tom | 455/558 |
| 2004/0037282 A1 | 2/2004 | Boland et al. | 370/392 |
| 2004/0133554 A1 | 7/2004 | Linn et al. | 707/2 |
| 2005/0007988 A1 | 1/2005 | Ferris et al. | 370/349 |
| 2005/0169310 A1 | 8/2005 | Knapp et al. | |
| 2007/0087735 A1 * | 4/2007 | March et al. | 455/418 |

* cited by examiner

EXTENSIBLE HUMAN MACHINE INTERFACE (HMI) PLUGIN ARCHITECTURE FOR RADIO SOFTWARE SYSTEM AND RELATED METHOD

FIELD OF THE INVENTION

The present invention relates to a software communication architecture (SCA) for radios and other applications.

BACKGROUND OF THE INVENTION

With advances in processing capabilities and programming technologies, software defined mobile wireless communications devices (e.g., radios) continue to increase in popularity. Rather than relying upon hardware and circuitry components to perform tasks such as frequency, modulation, bandwidth, security functions, and waveform requirements, these functions are performed by software modules or components in a software radio. That is, with a software radio analog signals are converted into the digital domain where the above-noted functions may be performed using digital signal processing.

Because most of the functions of the radio are controlled by software, software radios may typically be implemented with relatively standard processor and hardware components. This may not only reduce device hardware costs, but is also provides greater flexibility in upgrading the device since new communications waveform modules can be uploaded to the device relatively easily and without the need to interchange new hardware components.

One particular class of software radio, which takes advantage of the above-described advantages, features is the Joint Tactical Radio (JTR). The JTR radio includes relatively standard radio and processing hardware along with the appropriate waveform software modules for the communication waveforms the radio will use. JTR radios also utilize operating system software that conforms with the Software Communications Architecture (SCA) specification (see www.JTRS.saalt.mil), which is hereby incorporated by reference in its entirety. The SCA is an open architecture framework that specifies how hardware and software components are to interoperate so that different manufacturers and developers can readily integrate their respective components into a single device.

Still another class of mobile wireless communications devices that increasingly use software components for communicating using different waveforms or protocols are cellular communication devices. That is, many cellular devices are now designed to operate with more than one of the numerous cellular standards that are used throughout the world, such as the Global System for Mobile Communications (GSM) and Personal Communications Services (PCS), for example.

The Joint Tactical Radio System (JTRS) Software Component Architecture (SCA) defines a set of interfaces and protocols, often based on the Common Object Request Broker Architecture (CORBA), for implementing a Software Defined Radio (SDR). In part, JTRS and its SCA are used with a family of software re-programmable radios. As such, the SCA is a specific set of rules, methods, and design criteria for implementing software re-programmable digital radios.

The JTRS SCA specification is published by the JTRS Joint Program Office (JPO). The JTRS SCA has been structured to provide for portability of applications software between different JTRS SCA implementations, leverage commercial standards to reduce development cost, reduce development time of new waveforms through the ability to reuse design modules, and build on evolving commercial frameworks and architectures.

The JTRS SCA is not a system specification, as it is intended to be implementation independent, but a set of rules that constrain the design of systems to achieve desired JTRS objectives. The software framework of the JTRS SCA defines the Operating Environment (OE) and specifies the services and interfaces that applications use from that environment. The SCA OE comprises a Core Framework (CF), a CORBA middleware, and an Operating System (OS) based on the Portable Operating System Interface (POSIX) with associated board support packages. The JTRS SCA also provides a building block structure (defined in the API Supplement) for defining application programming interfaces (APIs) between application software components.

The JTRS SCA Core Framework (CF) is an architectural concept defining the essential, "core" set of open software Interfaces and Profiles that provide for the deployment, management, interconnection, and intercommunication of software application components in embedded, distributed-computing communication systems. Interfaces may be defined in the JTRS SCA Specification. However, developers may implement some of them; some may be implemented by non-core applications (i.e., waveforms, etc.), and some may be implemented by hardware device providers.

The SCA, however, does not specify the architecture for a Human Machine Interface (HMI) control and configuration management. It is necessary, then, to form an extensible architecture to allow dynamically loaded waveform specific interfaces to be implemented with a way to connect several HMI and waveform configuration management components. It is desirable to tie a configuration of a waveform to a radio-wide configuration. Previous radio human machine interfaces were statically built into the radio firmware and thus not dynamically upgradable.

SUMMARY OF THE INVENTION

In view of the foregoing background, it is therefore an object of the present invention to provide a software-defined radio that includes an executable radio software system operable with a radio circuit and conforming to the SCA specification that allows a human-machine interface.

In accordance with one aspect a non-limiting embodiment of the present invention, a software defined radio includes a radio circuit, an executable radio software system operable with the radio circuit and conforming to the SCA specification and defining an operating environment that allows a waveform application to operate with a radio circuit for transmitting and receiving voice and data. An extensible Human-Machine Interface (HMI) plug-in module is operable for allowing a selected waveform application to integrate with the radio circuit and provide an HMI user interface.

In yet another aspect, a system controller, ASCII engine and Front Panel engine are included. The HMI plugin module includes a waveform plugin shared object that is operable with a selected waveform application and has plugin components for the system controller, ASCII engine and Front Panel engine. The waveform plugin shared object can be formed as an ASCII plugin, a System plugin, and Front Panel plugin. The Front Panel plugin is operative for providing screens for configuring and operating the waveform application and providing a user interface.

In yet another aspect, the ASCII plugin is operative for providing remote control commands for configuring and operating the waveform application. The Front Panel and ASCII plugins communicate directly with the System plugin for relaying information to the waveform application. The System plugin can also be operable for maintaining a configuration of a selected waveform application.

In yet another aspect, a System Preset is linked to a selected waveform application for selecting a radio configuration. The System Precept can include a unique identifier and waveform name and waveform preset number for selecting and configuring a waveform application.

A method aspect is also disclosed.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout, and prime notation is used to indicate similar elements in alternative embodiments.

A extensible HMI plugin architecture, in one non-limiting example of the present invention, uses run-time loaded, dynamically linked libraries. Factory implemented design can be used to construct different components for a Front Panel, remote control and system database/control. Loadable components can use a common radio element to provide a consistent user interface, and CORBA can be used between user interfaces and the system database/control. Radio configurations can be selected using a System Preset that is linked to a waveform name and a waveform configuration.

In one non-limiting embodiment of the invention, an arbitrary number of waveforms can be inserted into a unified radio Human Machine Interface (HMI). The system provides waveform software that updates independent of radio-wide software and facilitates third party waveform development. The waveforms and operating environment can be integrated into a common field similar to a windows application environment. The operating environment can provide the infrastructure, widgets, database and rules, while waveforms provide content. Thus, the software communications architecture (SCA) that does not provide predefined mechanisms for the radio user interface is solved and can be incorporated into other radios that are using the SCA.

Figure 1:
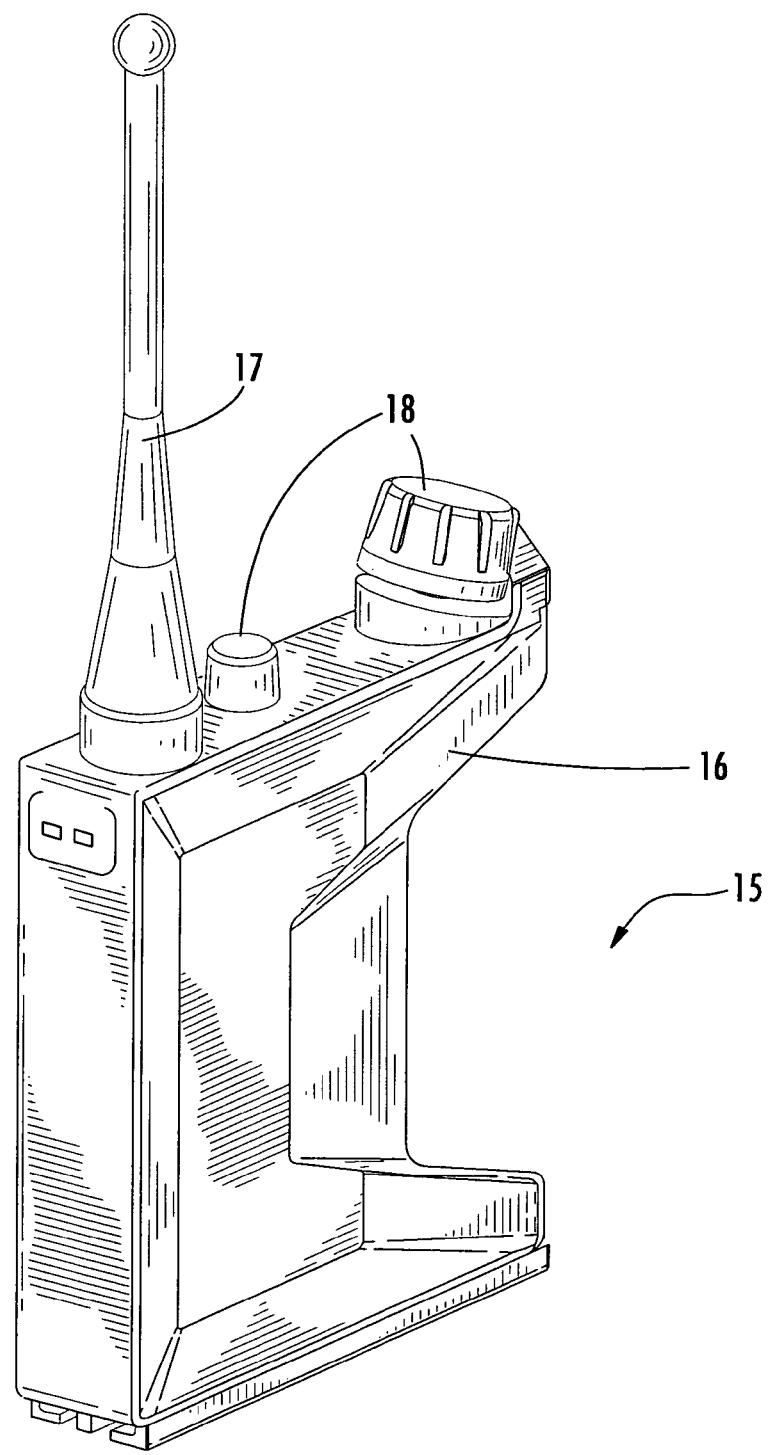
FIG. 1 is a perspective view of a portable wireless communications device as a handheld radio that could incorporate the extensible HMI plugin architecture for a radio software system and related method that is operating on the radio as illustrated.

The extensible HMI and plugin architecture can be used for any type of radio software communications architecture as used on mainframe computers with an added transceiver, such as to be used in large military installations or in a portable wireless communications device as illustrated in FIG. 1. The portable wireless communications device is illustrated as a radio that can include a handheld housing with an antenna and control knobs. An LCD can be positioned on the housing in an appropriate location for display. The various internal components including dual processor systems for red and black subsystems and software that is conforming with the software communications architecture platform is operative with the illustrated radio.

Figure 1A:
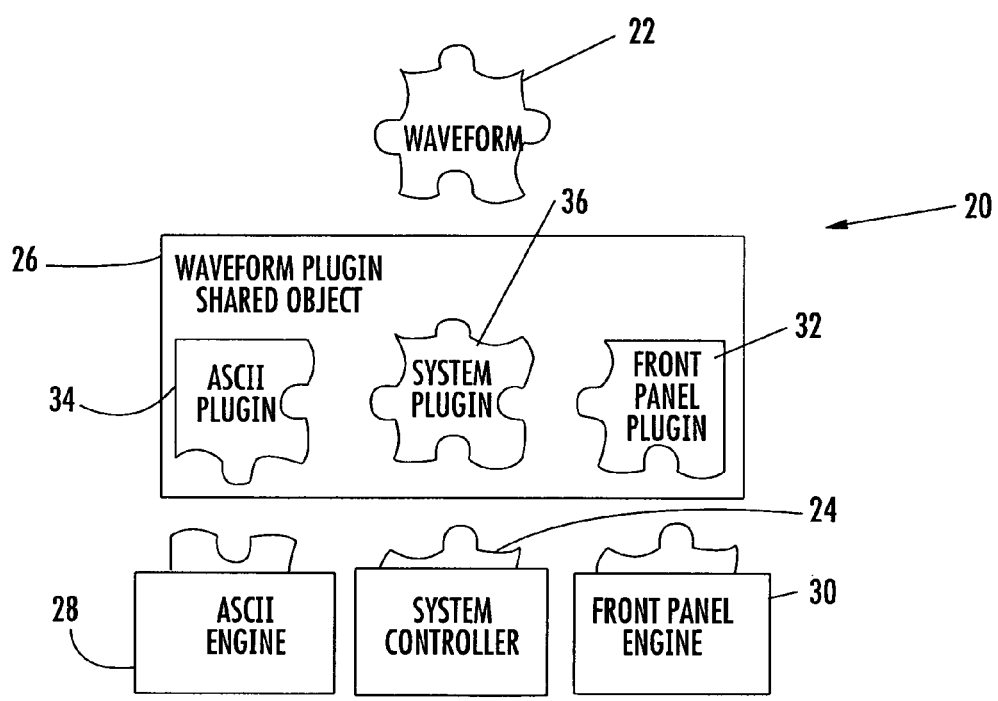
FIG. 1A is a block diagram illustrating a waveform plugin shared object and component interactions with the shared objects.

An extensible HMI plugin architecture as shown in FIG. 1A at 20, which provides a definition that allows a waveform 22 to integrate with the system controller 24 and include Human Machine Interface (HMI) components. Each waveform provides a Waveform Plugin Shared Object 26 that contains plugin components for the System Controller 24, the Ascii Engine 28 and the Front Panel Engine 30. The Front Panel Plugin 32 provides the necessary screens for configuring and operating the waveform 22. These screens are integrated into the "built-in" set of screens in the radio to provide a seamless user interface. The Ascii Plugin 34 provides remote control commands that extend the "built-in" set of commands for configuring and operating the waveform. The Front Panel 32 and Ascii Plugins 34 communicate directly to the System Plugin 36 for relaying the information to the waveform. This System Plugin 36 is also responsible for maintaining the configuration for the waveform. This configuration typically uses a global waveform configuration and one or more waveform configuration sets, called waveform presets. When the waveform is instantiated, one of these sets is passed down to the waveform to provide its operating parameters.

Figure 2:
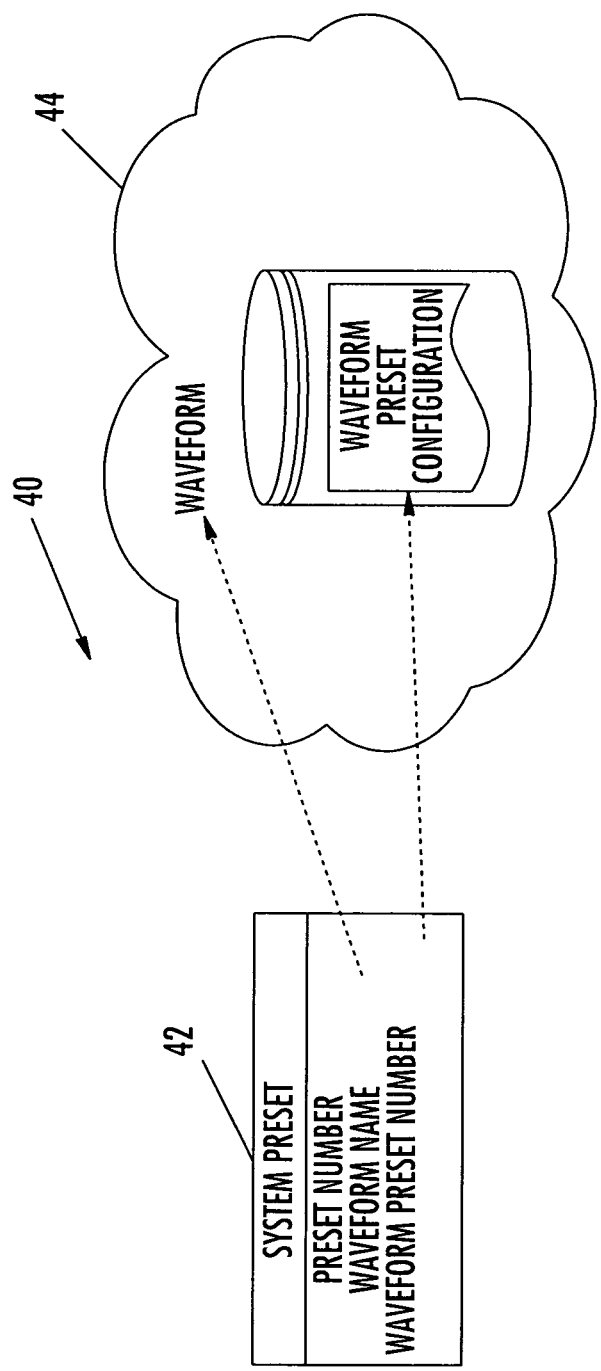
FIG. 2 is a block diagram illustrating a system preset to waveform preset mapping.

A JTRS radio can contain multiple waveforms, each of which has multiple sets of configuration that determine how the waveform should operate when instantiated. In order to facilitate selecting a waveform and a particular configuration set, a global System Preset system was created and an example is shown abstractly at 40 in FIG. 2. In addition to a unique identifier for the System Preset 42 (i.e., System Preset Number), the System Preset also contains a Waveform Name and the Waveform Preset Number for selecting and configuring the waveform 44 to be instantiated, e.g., selected, created or initialized, corresponding such as when a particular object type of the waveform is created. The Waveform Name matches the unique name given to the Waveform Application installed in the radio. The Waveform Preset Number is a unique identifier that selects a configuration set within the waveform. Using the Waveform Name, the SCA architecture is informed to load the appropriate Waveform Application. The Waveform Preset Number is used by the Waveform System Plugin to retrieve the appropriate configuration set, which is passed down to the Waveform Application when it is configured.

Figure 2A:
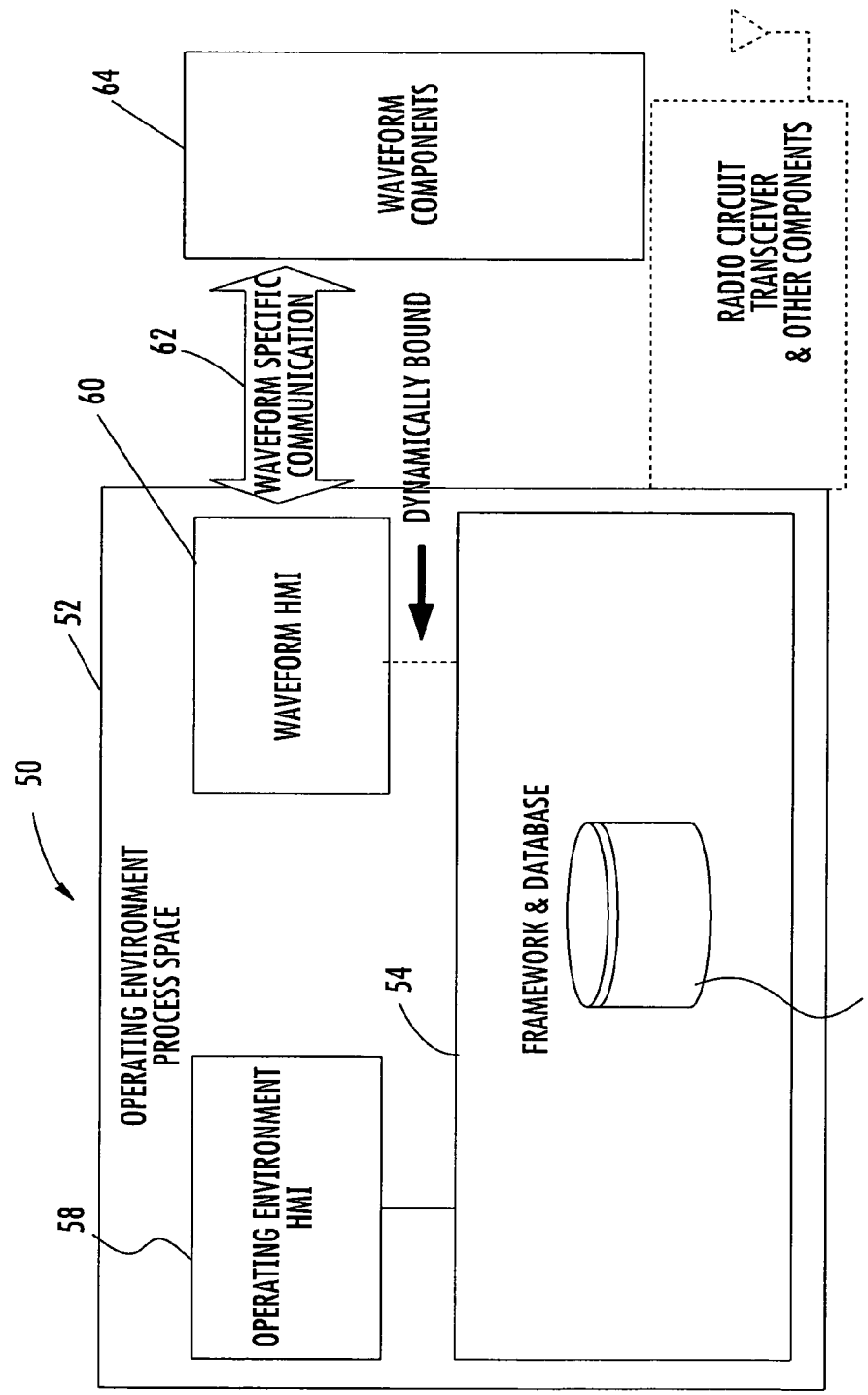
FIG. 2A is a high-level block diagram illustrating the operating environment process space as a platform and various operating environment HMI and waveform HMI operative with waveform components.

FIG. 2A is a block diagram showing basic components of the overall architecture 50 pertaining to the HMI plugin and shows an Operating Environment Process space 52 as a platform and having a Framework 54 and Database 56 and Operating Environment HMI 58 and Waveform HMI 60. Waveform specific communications 62 extend between the Platform 52 and Waveform Components 64. A radio circuit transceiver function and related functional components 65 are operative with the software and other components as illustrated as part of the software defined radio.

A plugin requires the waveform designer to develop a shared library and a pair of CORBA servants associated with the library. A plugin is a single term used to refer to this combination of a shared library and a CORBA servant.

An exemplary software operating environment specification for a radio includes a radio system control process, the Human Machine Interface (HMI) processes (Ascii and Front Panel), which typically execute on the "red" (command) general purpose processor (GPP) of the radio instead of the "black" (data) general purpose processor. A Plugin shared library allows the waveform designer to extend the Ascii command shell and a Front Panel menuing system, and provide a "published" Interface Definition Language (IDL) interface to the waveform's application specific behavior.

The shared library defined by a waveform's plugin is dynamically linked into the radio processes for any system control, any Ascii command shell, and any Front Panel menus. The class structure for a shared library typically has specialized dual inheritance hierarchy. One hierarchy provides base classes for any shared library plugins and another set of base classes for any factories, which build the plugin classes. A factory class hierarchy is a well-known design pattern for creating application specific components of a common base class type. This pattern is especially useful when the waveform designer adds application specific behavior to a radio in a predefined class hierarchy.

In addition to a dual class hierarchy, a waveform designer defines a CORBA servant which implements a "black box" interface for the waveform application, corresponding to the interface used by waveform HMI clients. These clients obtain a reference to the "black box" interface by using a CORBA Naming Service that is internal to the radio. All of the waveform interface objects are activated and run within the system control process of the radio.

Figure 3:
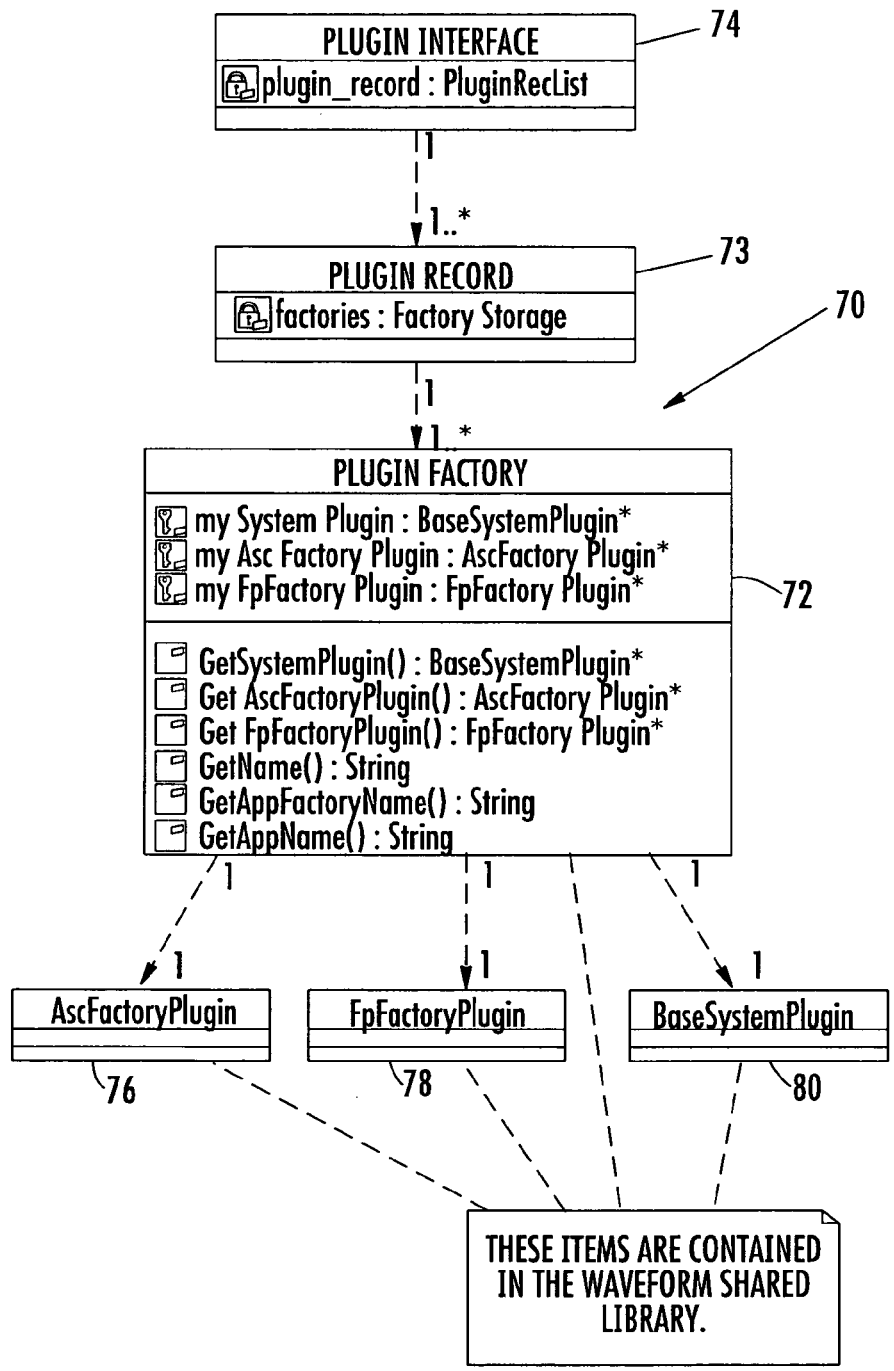
FIG. 3 is a block diagram showing a class hierarchy and showing various classes that can be utilized by a waveform's plugin.

A class hierarchy is shown in FIG. 3 at 70, and shows the classes that can be implemented by the waveform's plugin. A Plugin Factory 72 is operative as a Plugin Record 73, Plugin Interface 74 and Ascii Factory Plugin 76, Front Panel Factory Plugin 78 and Base System Plugin 80.

The plugin factory 72 is a first class in the framework that typically is implemented. It is used by the framework interface 74 as a central starting point for a component to the appropriate plugin's features from a waveform's plugin factory.

Any IDL definition that specifies the CORBA communication between the plugin components (namely between the Ascii or Front Panel plugin 32,34 and the System plugin 36 as shown in FIG. 1) could be broken up into two files: one that defines the enumerations, constants, structures, etc.; and 2) another that defines the interfaces. Both IDL files could declare the same module whose name is the current waveform name.

Figure 4:
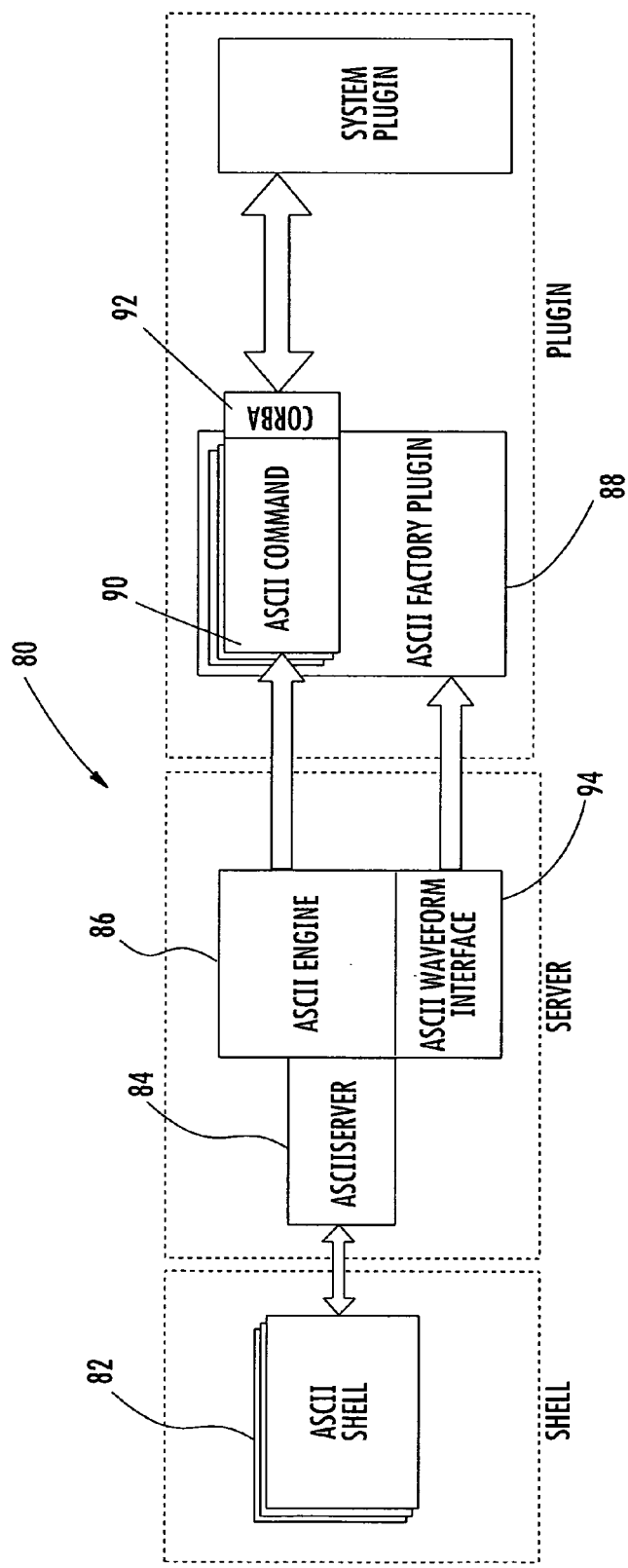
FIG. 4 is a block diagram of an Ascii command shell architecture that can be used in one non-limiting example of the present invention.

FIG. 4 is a block diagram of an exemplary Ascii command shell architecture 80 that is provided by an operating environment for a JTRS radio as a non-limiting example of the invention. An example where the architecture could be applied is a Falcon III radio as manufactured and sold by Harris Corporation of Melbourne, Fla.

The Ascii Shell 82 is the set of clients for the radio's central Ascii command server. There can be multiple command shells open to the radio at a given time and they can be provided over ttys, TCP/IP sockets, files, and/or any radio external serial ports.

The Ascii Server 84 centralizes the handling of calls coming from Ascii shells (radio clients) and provides Ascii output.

The Ascii Engine 86 handles translation of the input received from shell clients and parses a main Ascii shell command table to dispatch a correct command instance. Each Ascii command that is processed by the radio can be implemented as a distinct class.

The Ascii Factory Plugin 88 provides the base class from which each waveform Ascii command shell plugin is derived. The Ascii factory plugin uses the waveform's Ascii Factory Plugin to add each waveform specific command to the radio.

The Ascii Command 90 provides the base class from which each waveform specific command is derived. It contains the tables for each specific command, a way to handle the command when it is requested, and a way to handle the response that is returned. These plugin classes use the "black box" CORBA interface 92 to the waveform to execute specific commands.

Ascii Waveform Interface 94 installs commands from the plugins by calling the Ascii Factory Plugin 88 for each waveform installed. Instances of the commands are stored in a table of commands, and the main table structure for each command is stored in a vector in the Ascii Waveform Interface.

Figure 5:
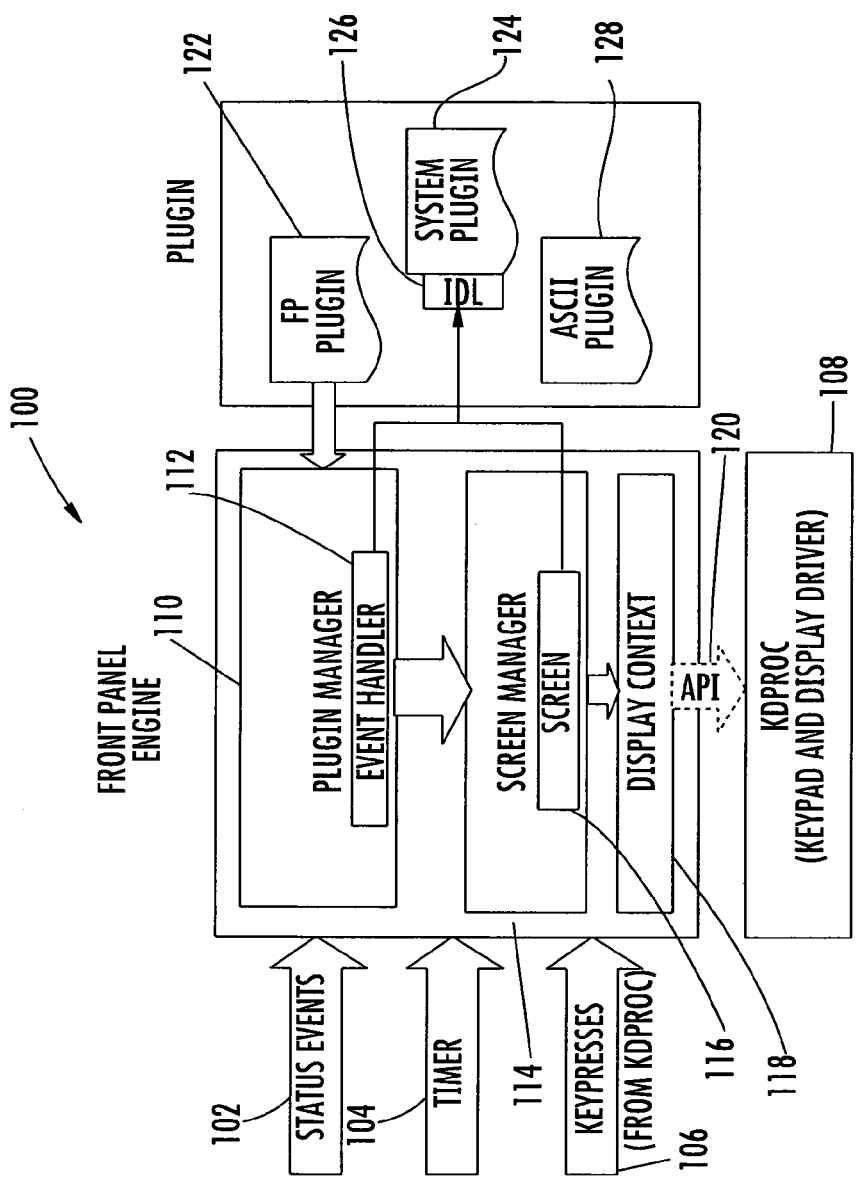
FIG. 5 is a block diagram of a front panel architecture showing a front panel engine and plugins that can be used in accordance with one non-limiting example of the present invention.

FIG. 5 is a block diagram of a Front Panel architecture indicated generally at 100, and provided for an exemplary radio operating environment using an SCA architecture.

Screens and other Front Panel components can register for and receive notification of (via a CORBA interface) status events 102 that can result in an event for that screen or component.

Screens and other Front Panel components can create timers 104 and will receive notification when those timers expire. The keypresses 106 are from a Keypad and Display Driver (KDPROC) 108 that screens can process and act upon. The Plugin Manager 110 is a repository of all Front Panel plugins and holds references to each plugin's Event Handler 112, which receives and processes any incoming events, for example, status events, timers, or keypresses. The Screen Manager 114 maintains and manages a screen stack of instantiated screens. A screen 116 is a layout and behavior of information to be displayed to the user. The Display Context 118 is an abstraction of the Keypad and Display Driver 108, which provides rules used to display the screens properly. The API 120 corresponds to the interface functions to the Keypad and Display Driver 108 to draw screens. As noted before the Keypad and Display Driver 108 controls the LCD and handles interrupts from the keypad.

The Front Panel Plugin 122 represents the portion of a waveform plugin devoted to the Front Panel and loaded in by the Plugin Manager 110. A System Plugin 124 is operative with the IDL 126 as an Interface Definition Language and operative with the Event Handler 112 and screen 116. The Ascii Plugin 128 is also illustrated and operative as a plugin.

Throughout this description, the term "widgets" is used. Widgets can be used to display different kinds of information. Some non-limiting examples of widget types are:

| Widget | Description (all Widgets act in a given defined region) |
| --- | --- |
| TextWidget | Display text |
| MeterTextWidget | Display a meter using text characters |
| GraphicWidget | Display a graphic |
| ScrollingTextWidget | Display a text list or menu |

In one non-limiting example, a radio platform can provide each waveform with the facilities to define a database used to store information that is needed by the waveform each time the waveform is selected (instantiated). This database is preserved in a non-volatile storage of the radio platform. It is expected that the waveforms that are added to a platform may use this database facility to store preset configuration and other waveform specific settings. The database interface also has the facilities to store non-persistent data in volatile memory. This allows the waveform to use a consistent interface to access configuration data that it defines regardless if the information needs to be persistent.

An exemplary radio database API uses many of the advanced features of C++ to facilitate automatic type conversion on input queries and on the results returned on database method invocations. This frees the waveform developer from having to concern themselves about wrapping variables in functions that provide type conversion.

When a waveform is initialized, the system searches its plugin directory for a defaults.sql file. If one is found, its version is checked, and if the versions differ between a database file and SQL file, the SQL file is evaluated. When a waveform is first installed, no database file will exist and the defaults.sql file will be used by the system to provide the starting database. The defaults.sql is defined with a version tag, which is used to determine when to perform a version upgrade of the database. A reference to the radio database API, such as for a Falcon III radio, is provided to the waveform through the base plugin class that each waveform must derive their plugin from. Once the waveform database is defined in the system, the waveform may access the database using this reference to the API and Standard Query Language (SQL) commands. Once the default database is created for each plugin, it is instantiated as 'dbase'. This will be used to access configuration data created by a defaults.sql when the plugin was initialized. Custom user databases can be created by instantiating another DatabaseAPI class. If the filename specified is ":memory:", the database will be stored only in local memory, and not in the file system.

As noted before, the radio architecture includes provisions to allow a waveform to extend the current functionality of the radio by providing the plugins to the HMI (Ascii and Front Panel) and the System Command and Database components as shown in FIG. 1A. The plugins 32, 34 and 36 associated with the waveform 22 are stored in a shared library object, called plugin.so, in one non-limiting example, which is loaded by the software either at power up or when the waveform is installed. When the plugin.so object is loaded, each component is extracted by the process that is responsible for maintaining that plugin component. If the waveform that owns the plugin.so file is currently instantiated, the plugins will have control over the radio, i.e., the Front Panel will display the top level screen specific to the waveform (as provided by the Front Panel plugin 32) and the System plugin 36 is allowed to configure the waveform so it can receive or transmit. If the waveform is not instantiated, then a smaller subset of the plugin functionality is still active, i.e. the waveform can be configured in program mode through the Front Panel and Ascii, and the system plugin 36 can receive programming commands from any HMI plugins.

Further details of the Ascii command shell 150 and related operating details shown in FIG. 4 are now explained with reference to FIG. 6 with the arrows between functional components indicative of various calls as explained in the call legend 152.

Figure 6:
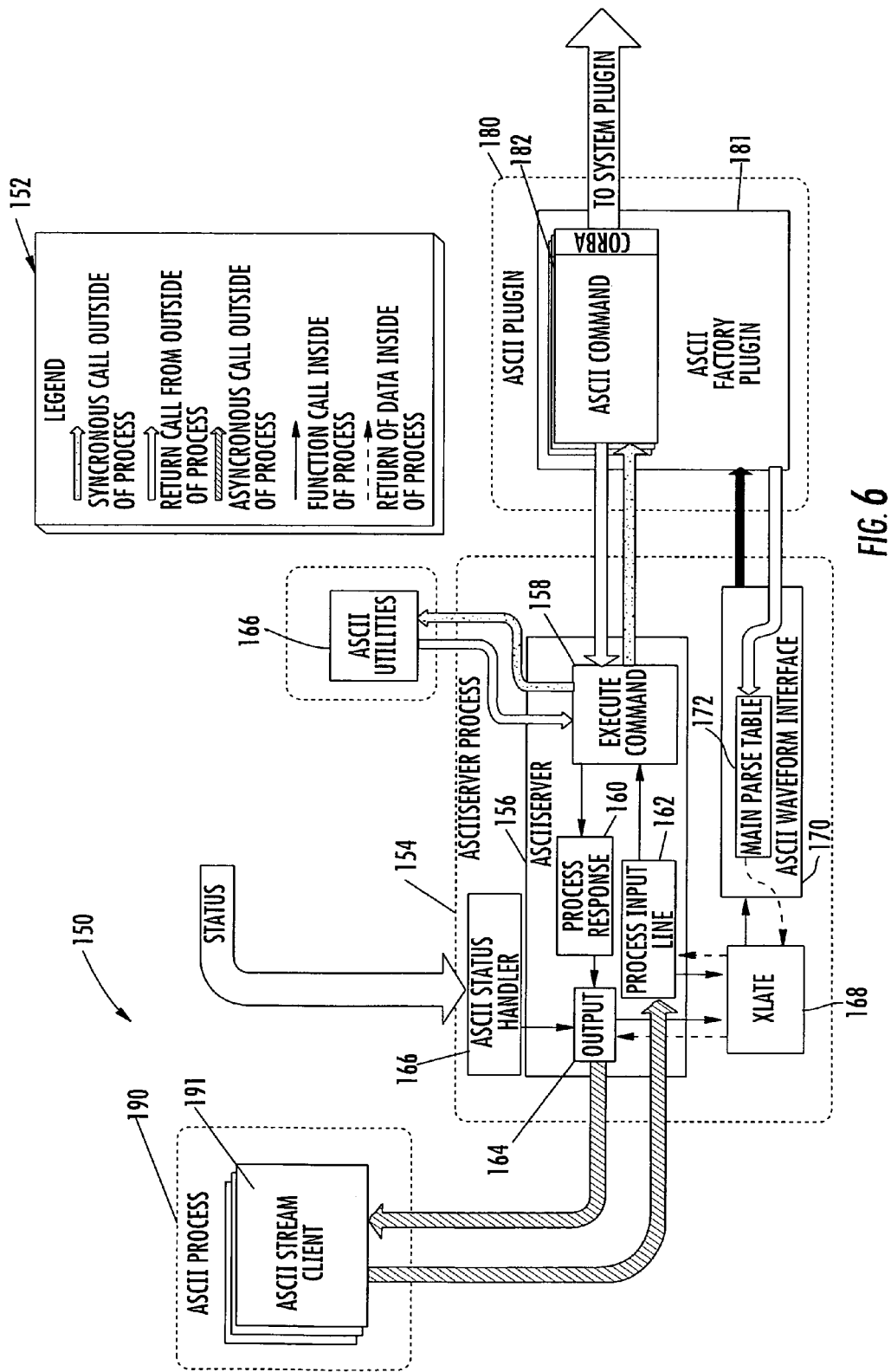
FIG. 6 is a block diagram showing further details of the Ascii command shell with greater details of the Ascii process, Ascii server and Ascii plugin.

As shown in FIG. 6, an Ascii Server Process 154 includes an Ascii Server 156 with basic functional components of an Execute and Command 158 operative with a Process and Response 160 and a Process Input Line 162. The Process Response 160 is operative with an Output 164, which in turn, is operative with an Ascii Status Handler 166. The Output 164 and Process Input Line 162 are operative with an Xlate function 168, which is operative with an Ascii Waveform Interface 170 and a Main Parse Table 172. The Execute Command 158 of the Ascii Server 156 is operative with an Ascii Plugin 180 that includes an Ascii Factory Plugin 181 and Ascii Command 182 having a CORBA interface 182 to a System Plugin. The Ascii Process 190 is operative with an Ascii Stream Client 191, which in turn, is operative with the Process Input Line 162 and Output 164 as indicated.

The Ascii Command Shell 150 creates a shell for user input, parses it, and executes a corresponding command. It allows waveforms to install waveform specific commands through a plugin.

The Ascii Stream Client 191 is the client for the Ascii Server 156. It handles communication over ttys, sockets, files, and the serial port. Any number of clients may be used for a single server. The Ascii Server 156 handles calls from any registered clients and handles any output that needs to be sent back to the clients. The Ascii Server 156 receives the raw data from the Ascii Stream Client 191 and processes the data. This could include, for example, removing extra white spaces, the carriage return, and the line feed. The data is translated and executed within an Ascii Command 182, and the data to be displayed is returned to the Ascii Server 156. This data is passed to a Process Response 160, which takes the data it receives and determines the proper output.

The Output Functions 164 take the data, call Xlate 168 to translate it to the proper output format, and pass the output data to the Stream Clients 191 to process and output to the screen. The Waveform Interface 170 installs all commands from the plugins by calling the Ascii Factory Plugin for each installed waveform. Instances of the commands are stored in a table of commands, and the main table structure for each command is stored in a vector in the Ascii Waveform Interface. Xlate 168 translates data from Ascii to binary and binary to Ascii. Xlate 168 uses the main parse table 178 in the Ascii Waveform Interface 170 to do the translation. Registers for all statuses are thrown from a notification service. The Status Handler 166 takes the statuses that have been thrown and outputs the text representation to the screen. The Utilities 166 contain a list of all the Ascii commands, which allows the Execute Command function 158 to get a reference to a command that needs to be called. An Ascii Factory Plugin is inherited by each waveform and contains an instance of every command for that waveform. The Factory Plugin 181 adds each command to the table vector that is passed into it. Ascii Command 182 is inherited by each command in a waveform. It contains the tables for the specific command, a way to handle the requested command, and a way to handle the returned response. It uses a CORBA call to the System Plugin to execute the requested command. The Ascii Server Class architecture includes a file, e.g., an AsciiClientList, which contains a list of all the instantiated classes that are in the Ascii Server Process 154 and inherited from the base class AsciiClient. The AsciiClient base class handles command processing and tracking, while the child classes contain the implementation for outputting.

Figure 7:
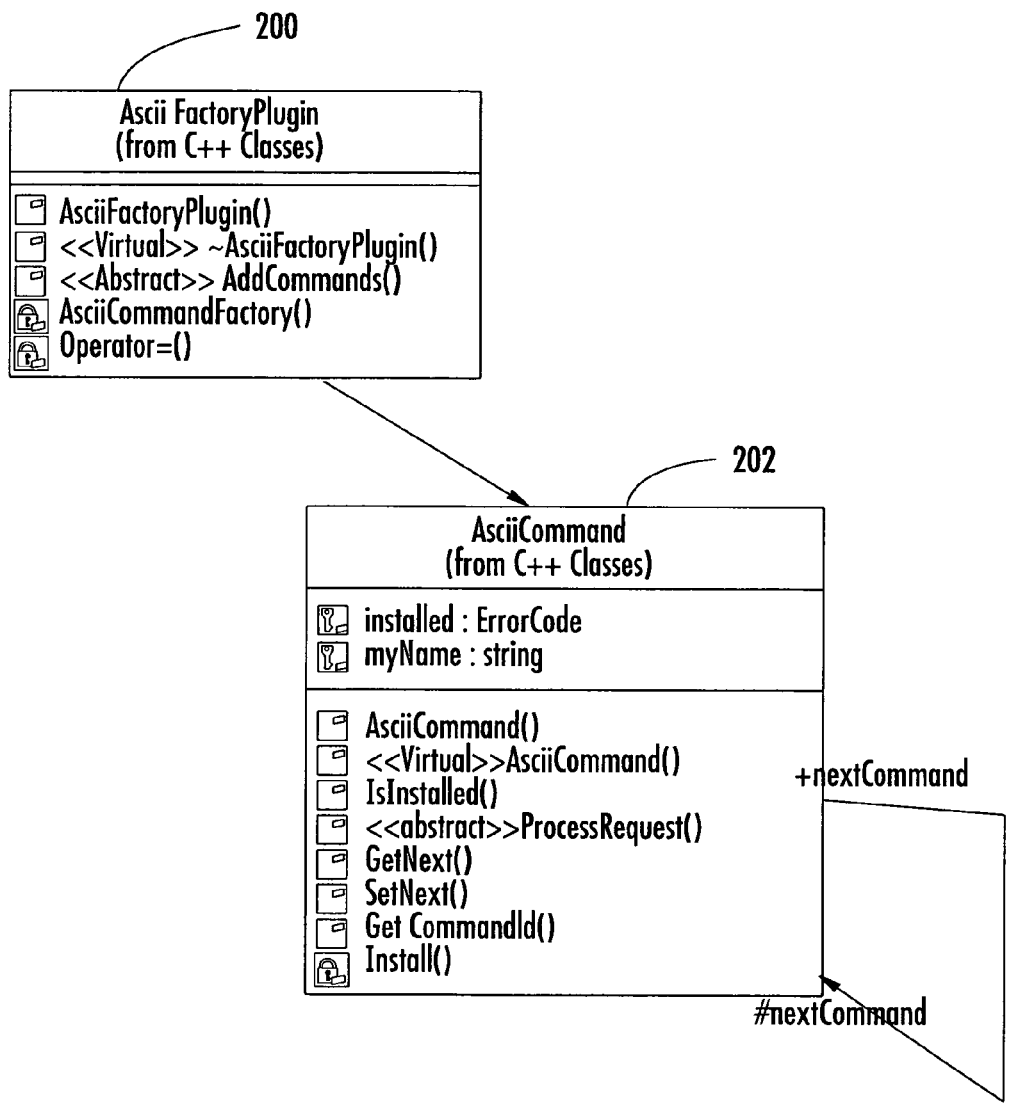
FIG. 7 is a class diagram showing a plugin architecture with base classes that can be used in accordance with one example of the present invention.

The plugin architecture has two base classes as shown in FIG. 7, i.e., the AscFactoryPlugin 200 class and the AsciiCommand 202. Waveforms typically will contain a single AscFactoryPlugin 200, but will have an AsciiCommand 202 for every implemented command. The AsciiFactoryPlugin 200 typically will contain the instantiation of every AsciiCommand 202 typically in that waveform. Every AsciiCommand 202 contains a pointer to the next command. The AscFactoryPlugin 200 is the interface between the Ascii engine and the plugin, while the AsciiCommand is the implementation for each Ascii Command.

The Front Panel would typically be the main user interface to the radio. It typically includes a display, an alphanumeric keypad, buttons and knobs that allow an operator to manage the radio and view its current state. The buttons could include a volume and squelch control. A handheld radio typically also has a Push-to-Talk (PTT) button for performing voice transmissions without a separate handset. The knobs provide a quick method for selecting a predefined shortcut as well as specifying the cipher mode (PT/CT). Additional functions provided by the knobs are loading keys and part of the procedure for performing a hardware zeroize.

Figure 8:
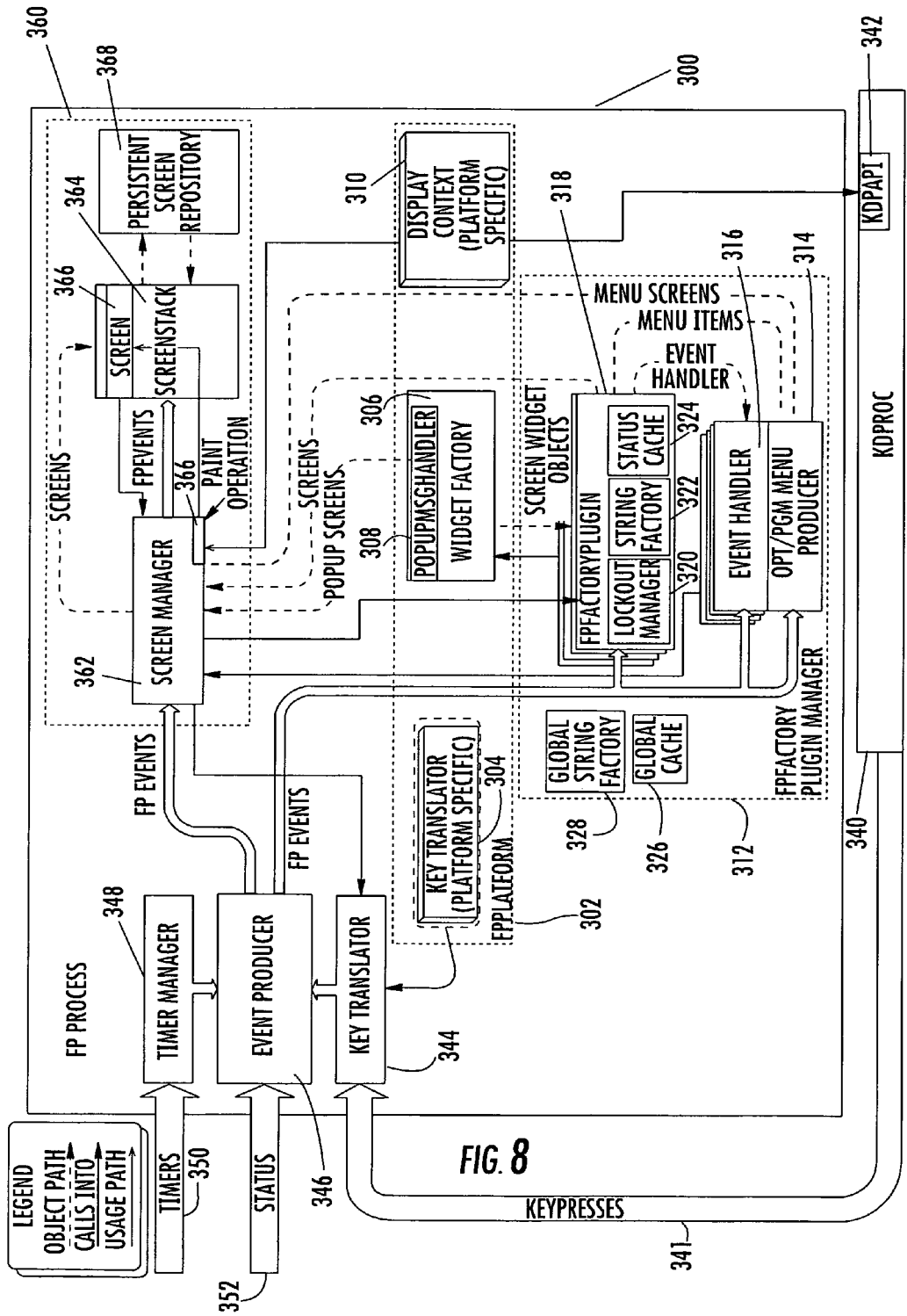
FIG. 8 is a block diagram showing details of a front panel engine.

A Front Panel Engine 300 is described relative to FIG. 8 and also includes in conjunction therewith a Keypad and Display Driver 340 that institutes keypresses 341 to be operative with various components of the Front Panel Engine 300.

The Front Panel Engine 300 includes a Front Panel Platform 302 that includes a Key Translator 304 that could be platform specific. A Widget Factory 306 includes a subfunction as a pop-up Message Handler 308. The Front Panel Platform 302 also includes a Display Context 310 that typically is platform specific. A Front Panel Factory Plugin Manager 312 includes various functions including an optional program Menu Producer 314 and Event Handler 316. A Front Panel Factory Plugin 318 includes a Lockout Manager 320 and String Factory 322 and Status Cache 324 and operative with various screen widget objects. The Front Panel Factory Plugin Manager 312 includes a Global Cache 326 and Global String Factory 328. Not only are the keypresses 341 operative with the Key Translator 344 that receives platform specific information from the Key Translator 304, but Timers 350 and Status 352 are operative with an Event Producer 346 and Timer Manager 348. Front panel events from the Event Producer 346 are sent to the Event Handler 316, Optional Program Menu Producer 314, and the Front Panel Factory Plugin 318. Also, events are sent to a Screen Function 360 that includes a Screen Manager 362 that has a paint operation that receives information and data from the Display Context 310. Front panel events are also sent to a Screen Stack 364 having Screens 366 that are also operative with a Persistent Screen Repository 368.

The Front Panel is controlled by several software components each of which have specific tasks for updating the display and receiving keypresses: The Keypad & Display Driver 340 the Front Panel Engine 300, and the Waveform Front Panel Plugins. The Keypad/Display Driver 340 is typically responsible for monitoring for keypresses and providing a simple abstraction of the display. The Front Panel Engine 300 is responsible for managing the screens provided by the Waveform Front Panel Plugins and distributing events (keypress 341, status 352, timers 350, etc.) to each of the plugins' components. These plugins work in conjunction with the Front Panel Engine 300 to provide screens and control that are specific to that waveform. They are able to interoperate with the Front Panel Engine by employing a Front Panel Framework that provides a foundation for all the Front Panel components provided by that plugin.

The Front Panel Engine ("The Engine") has four main responsibilities: (1) event distribution, (2) screen display, (3) Waveform Front Panel Plugin management, and (4) plugin isolation. The Front Panel Engine 300 receives events from several sources, including Status Events 352, Timers 350 and keypresses 341. Some of these events are distributed "as-is", while others, such as the Timers 350 and the keypresses 341, have to be interpreted before being passed to the Front Panel components. The Front Panel Engine 300 maintains a list of screens that are to be displayed and allows the screens in this list to be drawn in priority order. This list typically has screens provided by the Operating Environment and the Waveform Front Panel Plugin for the active waveform. The Front Panel Engine 300 is responsible for managing the Front Panel Plugins provided by the Operating Environment and all installed Waveforms. When a waveform is instantiated, the Front Panel Engine 300 ensures the appropriate plugin for that waveform is activated and available for use by the waveform before the instantiation operation has completed. Plugin isolation ensures that each Plugin is its own separate entity and cannot be affected by another Plugin.

The Front Panel Framework can be a set of interfaces which provides common access to the features provided by the Engine. These interfaces include required components that the Front Panel Engine needs to operate with the plugin, as well as basic screen implementations that aid in producing consistent-looking screen designs. It is up to the plugin to customize these interfaces to produce components that are applicable to its waveform.

A Plugin Manager 312 can handle all aspects of a waveform's Front Panel Plugin. The Plugin Manager 312 provides access to the plugin's screen navigator, lockouts, initialization, destruction, cache, string management, widgets, key management, screen management, and provides an interface to the plugin that the Engine can use to interface with the plugin. It also allows the Engine to retrieve any menu items associated with given buttons for that waveform so that they may be loaded into the main menu hierarchy. A display context abstraction allows components of the Front Panel Engine to draw text and graphics on the LCD Display. The display context is needed so that the Screen Manager may paint the screen, and individual widgets may paint a representation of themselves.

An Event Producer 346 receives external events, creates Front Panel events, and distributes the events to registered Front Panel clients. A Key Translator 344 maps incoming keypresses based on the current state of the Front Panel and provides them to the Engine for distribution. The Timer Manager 348 controls timer events that can occur in the Front Panel Engine. It allows timers to be started, stopped, restarted, removed, and ticked. The Timer Manager 348 also provides the capability of distributing timer events throughout the Front Panel Engine. The Widget Factory 306 allows the Front Panel Engine to create widgets and containers for widgets (screens). The Widget Factory 306 also provides access to any enunciator widgets, which allows waveform plugins to populate them with meaningful information. A Navigator Manager allows the Front Panel Engine to interface with the FpNavigator object of a waveform's Front Panel Plugin. This will allow the Engine to follow the correct screen flow provided by the plugin and to retrieve screen titles from the plugin (when available).

The Front Panel Engine is responsible for extending the display (e.g., an LCD) and keypad to the waveforms installed in the radio, giving preference to the currently instantiated waveform. In doing so, the engine is able to receive and handle keypresses and send draw commands to the Keypad. Each waveform provides a Front Panel plugin component that is pulled into the engine.

The Front Panel Engine 300 maintains the Screen Stack 346 as well as the Persistent Repository 368. Additionally, the Front Panel Engine handles timer and status events passing them to the appropriate screens in the stack.

Referring again to FIG. 5, there is shown how the Front Panel Plugin component 122 is retrieved from the waveform's plugin.so shared library (with system plug 124 and Ascii plugin 128) and placed into the Plugin Manager 110 that is responsible for maintaining references to the Front Panel Plugins 110 that are retrieved from installed waveforms at powerup. The Plugins provide various components, including an Event Handler 112 and Screens 116 that drive what is displayed on the screen. The Front Panel Plugin communicates with the waveform's System Plugin 124 (and the waveform itself) through means of an IDL Interface 126 that is exposed as part of the System Plugin.

Referring again to the engine block diagram in FIG. 8, there is shown the Screen Manager 362 as a class responsible for maintaining a list of current screens and the current screen in focus. Functionality is provided to activate and deactivate screens. The Front Panel Factory Plugin Manager 312 is responsible for installing, loading, and maintaining all of the Front Panel plugins 318 for the installed and active waveforms. A Front Panel Factory Plugin 318 is a Front Panel waveform plugin object that creates screen and event handler objects. The Event Handler 316 is a class provided by a plugin that receives events and is instantiated all the time. For example, an Event Handler 316 could be used to catch the "Call" button keypress event and display a waveform-specific Call Screen.

The Widget Factory 306 (provided by the Front Panel Platform 302) creates platform-specific screen and widget objects that are used by the plugins to create the screens and any displayed individual text and graphic items. The Display Context 310 (provided by the Front Panel Platform 302) provides an abstraction of the Display Driver for drawing text and graphics on a LCD display. A Key Translator 304 (provided by the Front Panel Platform 302) receives the raw keypress values 341 from the Keypad and Display Driver (KDPROC) 340 and translates to an appropriate value. It is also operative with the Key Translator 344 as a general function. The Timer Manager 348 keeps track of timers that are created within the Front Panel process and provides a notification when each timer expires.

The Event Producer 346 receives Option and Program keypresses and displays any top level Option and Program menu screens. Each plugin provides a list of items to be added to each menu screen. The Screen Stack 364 is a list of active screens 366, ordered by screen priority and the order in which the screen was added to a stack. A Persistent Screen Repository 368 is the list of screens that were taken off the Screen Stack 364 and did not want to be deleted. If a screen 366 is activated that currently resided in this repository, the screen object will be retrieved from here instead of requesting it from the plugin. By providing this repository, a screen is able to maintain state after being deactivated. The Front Panel Platform 302 is a platform-specific class that provides the DisplayContext 310, WidgetFactory 306, and KeyTranslator 304 that are compatible with the current hardware on which the Front Panel process is running.

Figure 9:
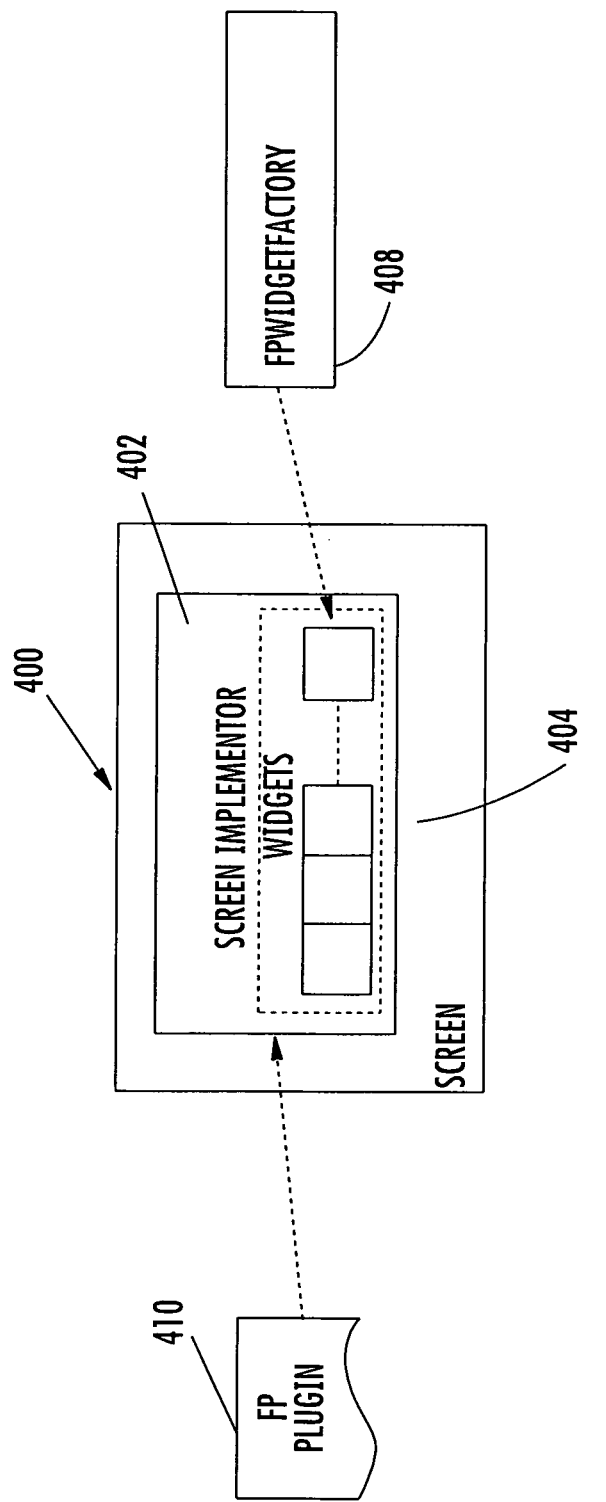
FIG. 9 is a block diagram showing a screen and screen implementer and widgets.

As shown in FIG. 9, every Screen 400 contains a Screen Implementer 402, which contains a list of Widgets 404 for that screen. A Screen 400 is defined by the functionality contained in the Screen Implementer 402, which is responsible for creating Widgets 404 using the Front Panel Widget Factory 408 and controlling their layout on the screen as also defined by the Front Panel Plugin 410. The operation of the Screen 400 is also controlled by a combined effort of the Widgets 404 and the Screen Implementer 408. The Widgets have their own unique operation specific to the widget type (i.e., scrolling for a ScrollingTextWidget, editing for an EditTextWidget, etc.). The Screen Implementer 408 provides the additional operation that ultimately defines how the screen responds to keypresses not handled by the widgets and Status and Timer Events that are intended for that screen. The operation of the Screen 400 is event-driven, meaning that all the functions within the Screen Implementer 402 are intended to execute and exit quickly and are called when a specific event occurs in the Front Panel Process (timer expires, a screen is deactivated, a screen is activated, a key is pressed, a status is thrown, etc.).

A Front Panel component provides a mechanism for receiving system event notifications from a notification service and display updates from an analog hardware management device. The Front Panel registers for status types with a notification service through a predefined port whenever a screen or plugin registers with the Front Panel to receive status notifications. A Front Panel plugin component only receives status notifications for which it has previously registered. The Front Panel remembers which status events it has already registered with the notification service so registration for each status type occurs only once. The analog hardware management device provides updated values to the Front Panel through a predefined port that allows the battery, receiver signal strength meter and transmitter transmit power meter to be updated. Since these updates can occur rather frequently and are generally only handled by the Front Panel, a separate port can be provided as a means of updating these values instead of distributing them via the notification service.

Figure 10:
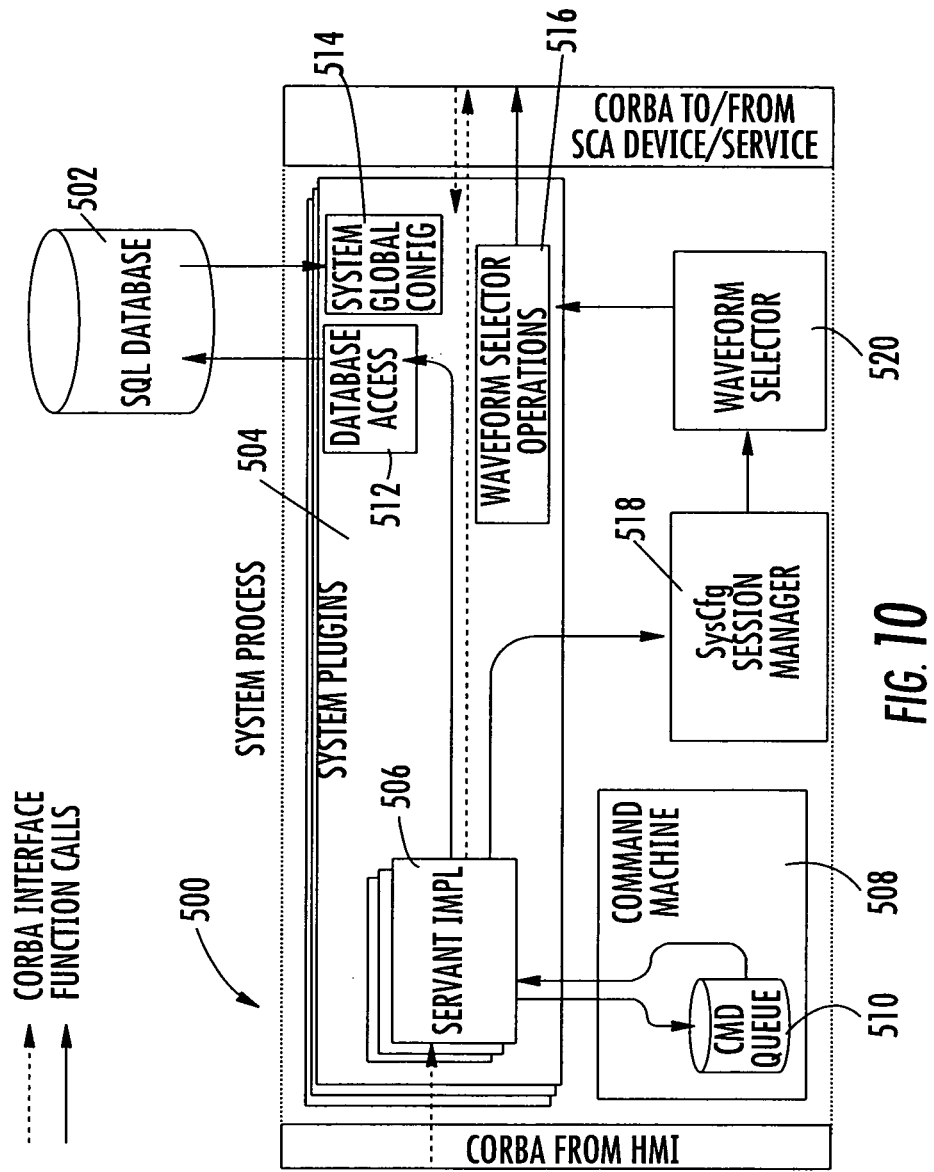
FIG. 10 is a block diagram of the system process.

The System Process 500 is shown in FIG. 10 provides a context in which commands are received, queued and executed by a radio platform. The majority of system process is executed with plugins, either a waveform plugin or the platform's plugin. The system also controls session and waveform selection, and coordinating events such as power-up and handling of statuses. Key components as illustrated include the SQL Database 502, and System Plugins Platform 504 having a Servant Implementation 506, Command Machine 508 with Queue 510, Database Access 512 and System Global Configuration 514, Waveform Selector Operations 516, System Configuration Session Manager 518, and Waveform Selector 520. Function calls are shown by the solid arrows and CORBA interfaces by the dashed arrows.

Figure 11:
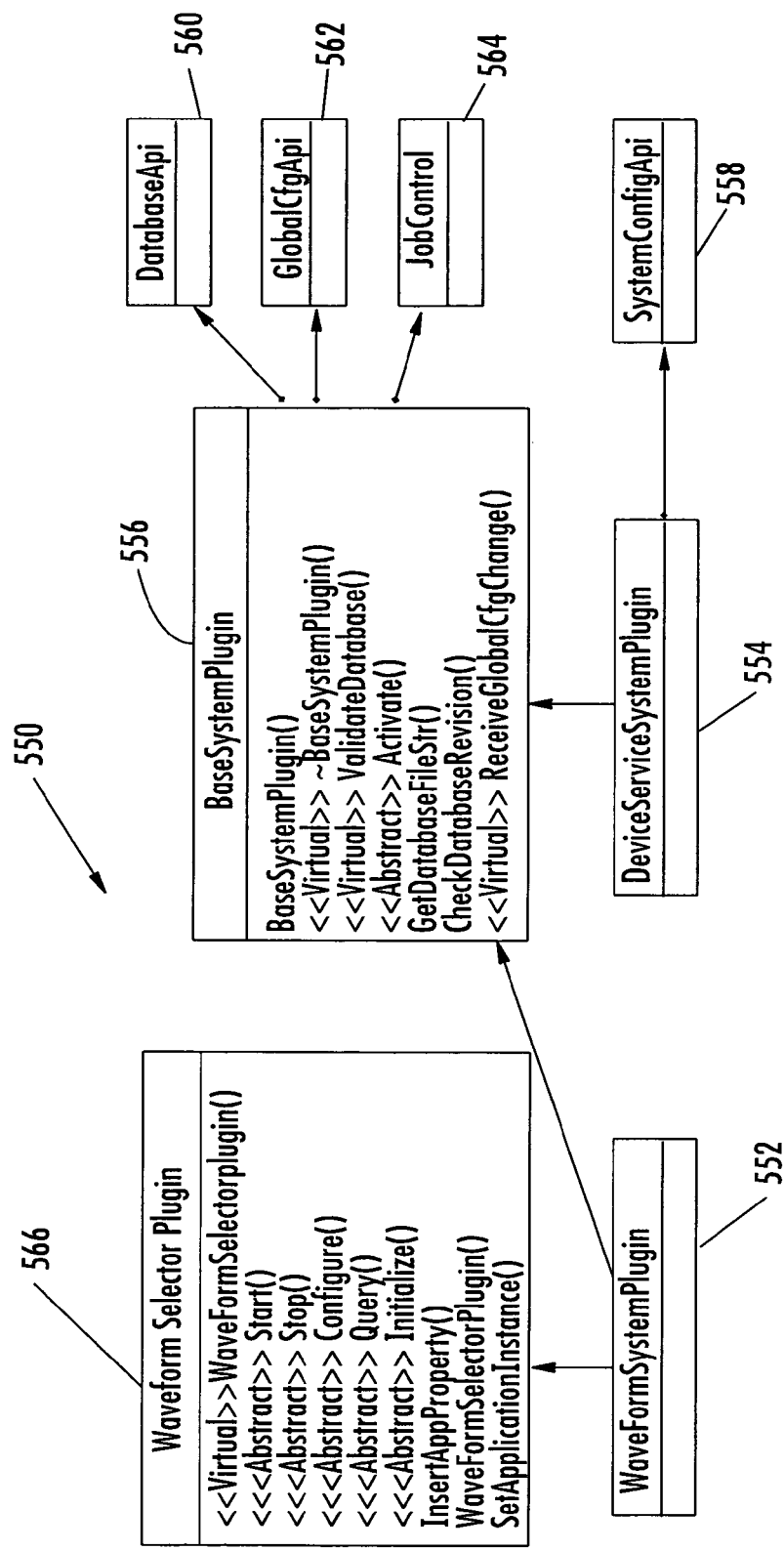
FIG. 11 is a class diagram showing the system plugins.

The System Plugin class diagram 550 shown in FIG. 11 is an aggregate of system servant implementations. System plugins are of two varieties, e.g., a WaveformSystemPlugin 552, or a DeviceServiceSystemPlugin 554. These classes are both subclasses of the BaseSystemPlugin 556, which defines functionality common to both and is generically accessed through a base class. The Device Service System Plugin 554 is operative with the System Configuration API 558. The Base System Plugin 556 is operative with the Database API 560, Global Cfg API 562, and Job Control 564. Waveform System Plugin 552 is operative with Waveform Selector Plugin 566. Each type of plugin (waveform or device/service) gives functionality specific to its applicable purpose.

Referring again to FIG. 10, encapsulated within each system plugin are implementations of CORBA interfaces. These CORBA servants are registered with the naming service to be used by other interfaces. The HMI interfaces, Ascii and Front Panel, will retrieve the reference from the naming service and call it into a system component. The majority of functional code is resident within these servants, such as calls into the database, system configuration, and other plugin functionality.

A system configuration component is responsible for providing an interface to a system plugin to request sessions and waveforms. These session changes provide an overall system state to the radio platform and ensure operations are consistent across the radio platform. Only devices, services and the platform are allowed to request these state changes and as such are only made available to any deviceservice plugins. This component also controls the power-up system state and is responsible for shortcut selection and throwing/handling of system statuses such as an opmode and power-up.

The Command Machine 508 contains the Command Queue 510 in which system jobs would be queued. This type of job queue ensures that only one job is executed on the system's context at once. Due to the nature of CORBA, there will be multiple threads used by servants that require access to shared data and interfaces. The Command Queue 510 ensures that only one thread has access to system resources at one time. The Command Machine 508 also ensures that the system is in a proper state to accept the job, and can enforce concepts such as a program mode.

Each system plugin as shown in FIG. 11 is given access to their own SQL Database 502 through the DatabaseApi 560. The plugin also provides functionality to reload the database from defaults if it does not exist or the table structure changes.

A System Global Configuration module 514 provides a cache of parameters to be commonly used across all waveforms, devices and services. This allows the platform to provide access to specific parameters without exposing the entire database.

A Waveform Selector Component 520 is responsible for providing an interface between a waveform plugin and the waveform application. This functionality is typically available only to waveform plugins. The Waveform Selector 520 will construct a new application instance if required and give it to the plugin, and request commands to start, stop, configure, etc. It will also deactivate old waveforms when a new one is selected. The operations in the plugin allow it to retrieve configuration parameters from the database when configuring.

Figure 12:
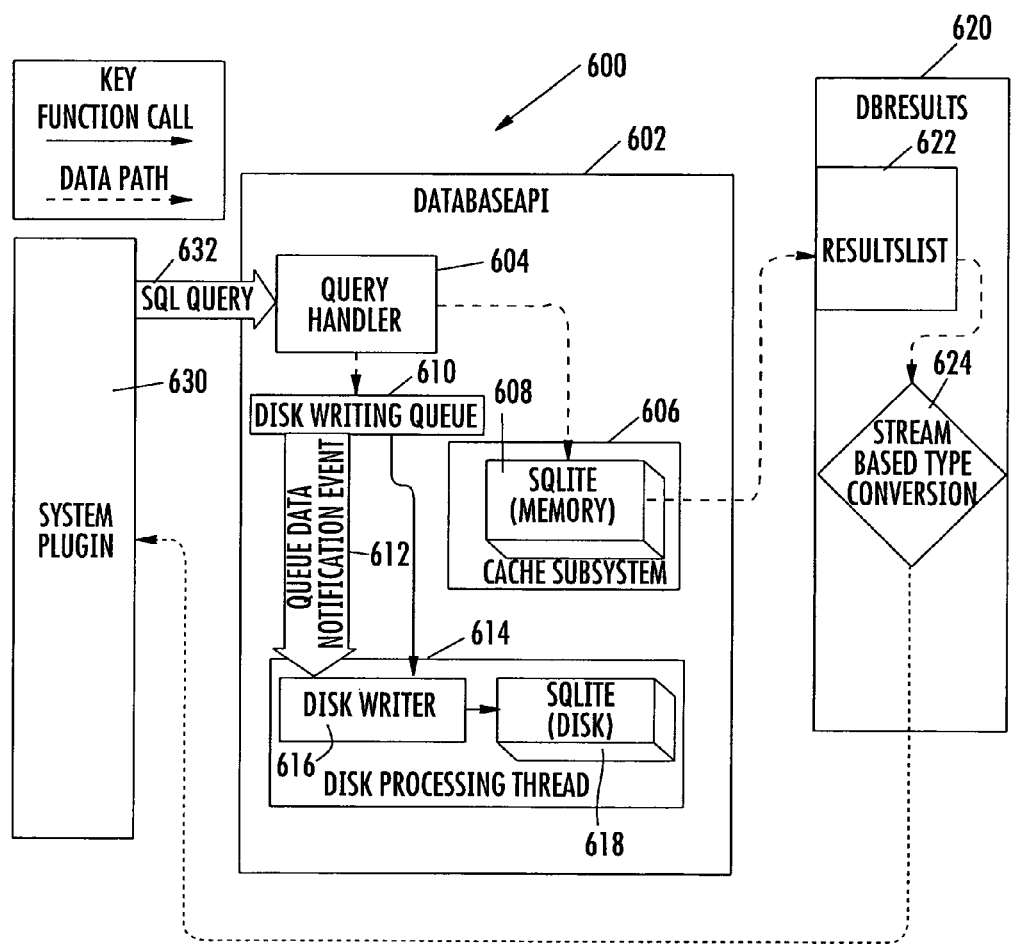
FIG. 12 is a block diagram of the database system that can be used in accordance with one non-limiting example of the present invention.

An example of a database system 600 operative as part of the HMI plugin architecture is shown in FIG. 12. A Database API 602 includes a Query Handler 604 that is operative with a Cache Subsystem 606 that includes an SQLite (memory) 608. The Query Handler 604 is operative with a Disk Writing Queue 610 that is also operative through a Queue Data Notification Event 612 with a Disk Processing Thread 614 that includes a Disk Writer 616 and SQLite (disk) 618. The SQLite memory is operative with Database Results 620 that are operative with a Results List 622 and Stream Base Type Conversion 624. A System plugin 630 receives a data from the stream based type conversion that, in turn, is operative with the Query Handler 604 through an SQL Query 632.

The DatabaseAPI 602 provides a thread-safe C++ interface to an SQL database backend. The interface is designed such that type conversion is done automatically, and a developer does not have to use wrapper function to convert from the database internal format (strings) to the desired C/C++ type. When the database is instantiated, the current database structure on disk is loaded into memory, if a cache is used. Subsequent reads are done from memory, while writes are done to memory and disk. All set and get queries are initiated with the query function. This function will send the query string to a sister thread that performs all disk writes. The main thread will query only the memory for the result.

Results are stored in a dbResult class. This class uses overloaded C++>> operators to perform automatic type conversion from the internally represented type to the desired user type. SQL files are automatically rolled into the target image as part of the build process.

The DatabaseAPI is configured once, upon instantiation. There is typically no mechanism to reconfigure the properties once the database is running. The configurable options include the filename of the database, the mode of the database file, and whether caching is enabled. Upon instantiation of a databaseAPI, if the cache is enabled, any tables existing on the filesystem are first copied into memory. All future reads are done strictly from the database stored in memory.

All queries are queued to write to the disk when resources are available. A flushCache call can be used to ensure that all queued commands are flushed. This function will block until the process completes. All queries can be done with a query function. This function will either take an SQL query as a string, or no parameters at all. In either case, a dbResults class is returned. This class stores any results from the query (which are extracted using a C++>> operator) and can optionally take input via the C++<< operator. This is particularly useful to avoid having to use wrapper functions when constructing an SQL query. Results from a query are stored in a dbResults structure. This structure has two primary methods of extracting the data. If no row or column header is specified, the value from the first row and first column is extracted.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A software defined radio comprising:
   a radio circuit and display;
   an executable radio software system operable with the radio circuit and display and conforming to the Software Communications Architecture (SCA) specification and defining an operating environment that allows a waveform application to operate with the radio circuit for transmitting and receiving voice and data;
   a system controller;
   an ASCII engine;
   a Front Panel engine; and
   a plurality of waveform plugin shared objects, a selected one of which is operable with a selected one of a waveform application, each of the waveform plugin shared objects comprising ASCII, system and front panel plugin components for the system controller, ASCII engine and Front Panel engine; and said system controller, ASCII engine and Front Panel engines are configured to implement command and database interfaces from the waveform plugin shared objects and provide a human machine interface and dynamically load each waveform application, wherein the Front Panel engine is operable to configure a screen on the display based on data contained in a front panel plugin component to define a user interface specific to a loaded waveform application and the ASCII engine is configured to receive data and transform the data into ASCII commands to be processed by the radio circuit and by executable radio software as distinct classes for installed waveform applications.

2. A software defined radio according to claim 1, wherein said Front Panel plugin component is operative for providing screens for configuring and operating the waveform application and providing a user interface.

3. A software defined radio according to claim 1, wherein said ASCII plugin component is operative for providing remote control commands for configuring and operating the waveform application.

4. A software defined radio according to claim 1, wherein said Front Panel and ASCII plugin components communicate directly with said System plugin component for relaying information to the waveform application.

5. A software defined radio according to claim 1, wherein said System plugin component is operable for maintaining a configuration of a selected waveform application.

6. A software defined radio according to claim 1, and further comprising a System Preset linked to a selected waveform application for selecting a radio configuration.

7. A software defined radio according to claim 6, wherein said System Preset includes a unique identifier and a waveform name and waveform preset number for selecting and configuring a waveform application.

8. A software defined radio according to claim 1, and further comprising a database and an extensible HMI plugin component configured to access said database.

9. A system for extending a Human Machine Interface (HMI) to a software defined radio comprising:
a system controller and display;
an ASCII engine;
a Front Panel Engine;
a plurality of waveform plugin shared objects, a selected one of which is operable with a selected one of a waveform application, each of the waveform plugin shared objects comprising ASCII, system and front panel plugin components operable with the system controller, ASCII engine and Front Panel Engine, and at least one of said system controller, ASCII engine and Front Panel engine are configured to implement command and database interfaces from the waveform plugin shared objects to provide a human machine interface and dynamically load each waveform application;
an ASCII command shell representative of radio clients and front panel menus and having a class structure providing base classes for ASCII, system and front panel plugin components and base classes for a factory class hierarchy that builds plugin classes; and
a Common Object Request Broker Architecture (CORBA) servant that implements command and database interfaces of the waveform application and waveform plugin shared objects, wherein the Front Panel engine is operable to configure a screen on the display based on data contained in a front panel plugin component to define a user interface specific to a loaded waveform application and the ASCII engine receives data and transforms the data into ASCII commands to be processed by the radio circuit and executable radio software as distinct classes for installed waveform applications.

10. A system according to claim 9, and further comprising a shared library object that stores the plurality of waveform plugin shared objects.

11. A system according to claim 10, wherein said shared library object is loaded at a power up of the software defined radio.

12. A system according to claim 10, wherein said shared library object is loaded when a waveform application is installed for operation in the software defined radio.

13. A system according to claim 9, wherein said base classes provide a factory class hierarchy and are operative for creating application specific components for operation of the software defined radio.

14. A system according to claim 9, including a database associated with each waveform plugin shared object, wherein each waveform plugin shared object has access to a database through an application programming interface (API).

15. A method for extending a Human Machine Interface (HMI) to a software defined radio, which comprises:
providing a system controller and display;
an ASCII engine;
a Front Panel Engine;
loading a plurality of waveform plugin shared objects and a selected one associated with a selected waveform application, each of the waveform plugin shared objects having ASCII, system and front panel plugin components for the system controller, ASCII engine and Front Panel Engine, and providing an ASCII command shell representative of radio clients and front panel menus and having a class structure providing base classes for the ASCII, system and front panel plugin components and base classes for a factory class hierarchy that builds plugin classes; and
implementing command and data interfaces from the waveform plugin shared objects to provide a human machine interface and dynamically load each waveform application from implemented data and commands of the waveform applications using a Common Object Request Broker Architecture (CORBA) servant, and
configuring a screen on the display based on data contained in a front panel plugin component to define a user interface specific to a loaded waveform application, and
receiving data in said ASCII engine and transforming the data into ASCII commands for processing by the radio circuit and executable radio software as distinct classes for installed waveform applications.

16. A method according to claim 15, which further comprises storing the waveform plugin shared objects within a shared library object.

17. A method according to claim 16, which further comprises loading the shared library object at power up of the software defined radio.

18. A method according to claim 17, which further comprises loading the shared library object when a waveform application for software defined radio is installed.

19. A method according to claim 15, which further comprises creating application specific components for operation of the software defined radio using the base classes for the factory class hierarchy.

20. A method according to claim 15, which further comprises accessing a database associated with each waveform plugin shared object through an application programming interface (API).

\* \* \* \* \*